United States Patent

[15] 3,701,015
[45] Oct. 24, 1972

Dittman

[54] MAGNETIC PICKUP WITH FEEDBACK CIRCUIT

[72] Inventor: Kenneth C. Dittman, Deerfield, Ill.

[73] Assignee: Electro Products Laboratories, Inc.

[22] Filed: Jan. 20, 1971

[21] Appl. No.: 108,052

[52] U.S. Cl. .................. 324/174, 307/291, 324/166
[51] Int. Cl. ............................................. G01p 3/48
[58] Field of Search ...... 324/161, 162, 173, 174, 175, 324/166; 307/235, 291

[56] References Cited

UNITED STATES PATENTS 3,356,082   12/1967   Jukes ......................... 324/173

Primary Examiner—Rudolph V. Rolinec
Assistant Examiner—David M. Carter
Attorney—Hofgren, Wegner, Allen, Stellman & McCord

[57] ABSTRACT

A magnetic pickup having an electronic switch circuit for generating a high level digital signal having improved signal form and an improved signal to noise ratio. The switch has an input transistor connected to a sensing coil and an output transistor which generates a digital output signal. The circuit further includes a feedback connection between the output transistor and the input transistor to stabilize operation for low level voltages induced in the pickup coil.

1 Claim, 3 Drawing Figures

PATENTED OCT 24 1972  3,701,015

Inventor:
Kenneth C. Dittman
By Hofgren, Wegner,
Allen, Stellman & McCord
Att'ys

MAGNETIC PICKUP WITH FEEDBACK CIRCUIT

BACKGROUND OF THE INVENTION

This invention relates to a magnetic pickup having a sensing device responsive to a change in flux linking a coil.

A common application of a magnetic pickup is in a system for measuring the speed of a rotating shaft. The pickup is located adjacent a gear on a shaft and senses movement of the gear teeth. The voltage induced in a coil is a function of the coil inductance and the rate of change of flux linking the turns of the coil.

Where the actuator is coarse, as slow moving, widely pitched gear teeth, the output is a series of voltage pulses followed by an exponential decay. With a fine actuator, i.e., rapidly moving closely spaced gear teeth, the output voltage approximates a sine wave. Both the form and the amplitude of the output are functions of the relative speed of movement between the pickup and the body being sensed.

Depending upon the physical nature of a given setup, including such factors as the orientation of the coil with respect to the gear teeth or the like, and the rate of relative movement, as well as the nature of the gear teeth, the voltage level induced in the coil and applied to the sensing circuit may vary significantly.

As a result, in some instances, the voltage induced in the coil is of such a low level that a stabilized output signal cannot be obtained. For example, such will occur for slow-moving, coarse actuators.

SUMMARY OF THE INVENTION

It is the principal object of the invention to provide a new and improved magnetic pickup sensing system. More particularly, it is an object of the invention to provide a magnetic pickup and sensing system wherein the stabilized output signal can be obtained in such situations where the voltage induced in a pickup coil is at an extremely low level as would normally cause instability in the output signal.

The exemplary embodiment achieves the foregoing objects in a magnetic pickup sensing system that generates a digital output signal by means of a circuit employing a bistable electronic switch having an input connected to a sensing coil and an output at which the digital signal appears. A feedback signal from the output of the electronic switch is connected to the input to supplement the voltage from the coil.

More particularly, the exemplary embodiment of the invention employs a switch comprised of a first transistor having its base connected to the coil and its emitter-collector circuit connected in series with a resistor across a source of power. The common junction of the resistor and the first transistor is taken to the base of a second, output transistor which has its emitter-collector circuit connected in series with a second resistor across the source of power. The common junction of the resistor and the output transistor is then connected through a resistance to the base of the first transistor to provide the above-mentioned feedback. The overall arrangement is such that when a voltage is induced in the coil, the first transistor is turned on and the second transistor is turned off to generate the output signal. A portion of the output signal is fed back to the base of the first transistor to supplement the voltage induced in the coil so that the signal applied to the base of the first transistor is of sufficient magnitude to maintain the same in a conducting state so long as even an extremely low level voltage is being induced in the pickup coil.

Other objects and advantages of the invention will become apparent from the following specification taken in conjunction with the accompanying drawings.

DESCRIPTION OF THE PREFERRED EMBODIMENT

Figure 1:
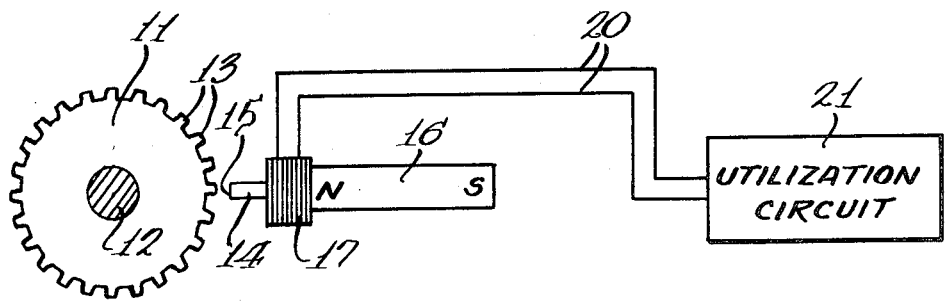
FIG. 1 is a diagrammatic illustration of a magnetic pickup sensing system.

The off-on switching circuit which is incorporated in the magnetic pickup unit in accordance with the present invention produces a digital or off-on output. An exemplary embodiment of the switching circuit in one environment of intended use is illustrated in FIG. 1 and is seen to comprise a pickup unit 10 in a system for determining the speed of rotation of a gear 11 mounted on a shaft 12. The teeth 13 of the gear 11 move past the end of a core 14 which forms a pole piece 15. A permanent magnet 16 is located rearwardly of the core 14 and establishes a magnetic field through it. A coil 17 surrounding the core 14 is linked by the flux from the magnet 16.

As the teeth 13 of the gear 11 move past the pole piece 15, the reluctance of the magnetic path to flux from the magnet 16 varies and thus the total flux linking the coil 17 varies. The resulting voltage induced in the coil 17 is connected through conductors 20 with any suitable utilization circuit 21. The details of the utilization circuit form no part of the invention and may comprise any one of a number of suitable circuits in the prior art.

Figure 2:
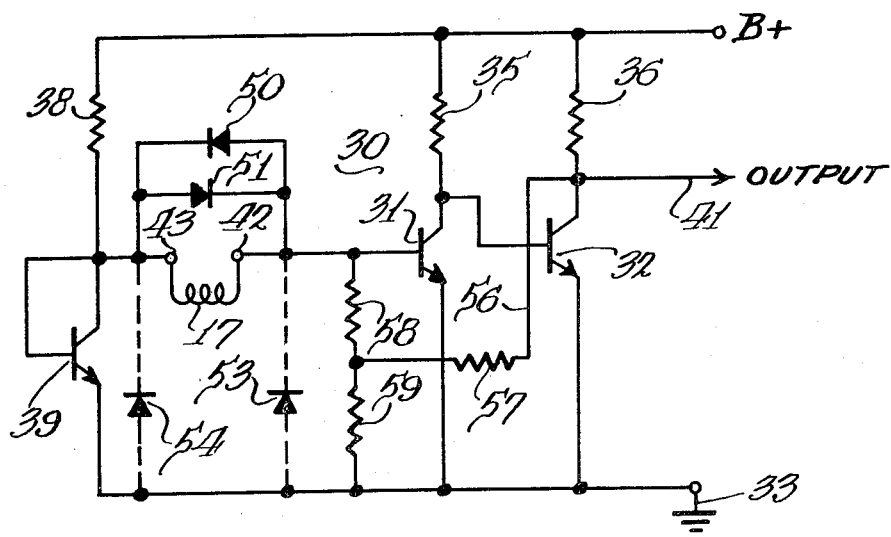
FIG. 2 is a circuit forming one embodiment of the invention.

An exemplary embodiment of a circuit made according to the invention is illustrated in FIG. 2 and basically is of the type disclosed in the copending application of Gordon E. Gee, entitled "Magnetic Pickup," Ser. No. 875,983, filed Nov. 12, 1969, and assigned to the same assignee as the instant application. In particular, the circuit illustrated in FIG. 2 is basically similar to that illustrated in FIG. 5 of the above-identified Gee application. However, it is to be understood that the principles of this invention are equally applicable to, for example, the circuit illustrated in FIGS. 3 and 4 of the above-identified Gee application as well as such variations thereof as may occur to those skilled in the art. Further, during the course of the following description of the invention, specific type designations and component values will be given for the circuit illustrated in FIG. 2. The purpose of this specific disclosure is to illustrate an operative embodiment of the invention and the values and relationships are not to be taken as critical unless otherwise specified.

A transistorized switching circuit 30 has an input stage 31 and an output stage 32, each a transistor. The circuit 30 is powered from a suitable source of positive potential, B+, the negative terminal of which is connected with a reference potential or ground 33. The emitters of the transistors 31 and 32 are connected directly to ground while the collectors of both transistors 31 and 32 are connected through respective resistors 35 and 36 to the source of power. The base of the output transistor 32 is connected to the collector of the transistor 31 while the base of the transistor 31 is connected to one side of the pickup coil 17.

The input transistor 31 is normally held in a non-conductive state. A bias is applied to the base of the input transistor 31 through a network including a resistor 38 in series with a diode connected transistor 39 connected across the power supply.

The junction between the resistor 38 and the diode connected transistor 39 is connected through the pickup coil 17 to the base of the input transistor 31 so that when no voltage is induced in the pickup coil 17, the input transistor 31 will be cut off. The voltage at its collector will be essentially that of the power source and by virtue of the connection thereto to the base of the output transistor 32, the latter conducts. The collector of the output terminal 32 will be substantially at ground and output terminal 41 is at ground level.

When a voltage is induced in the pickup coil 17 and is such that the right-hand terminal 42 thereof becomes positive with respect to the left-hand terminal 43 by an amount sufficient to render the base of the input transistor 31 positive with respect to its emitter, the transistor 31 will begin conducting. The potential at its collector will become essentially ground and is applied to the base of the output transistor 32 thereby turning the same off. The output terminal 41 will swing positive to essentially the voltage of the source to initiate the emission of a digital output signal. So long as the base of the input transistor 31 remains positive with respect to its emitter, the output transistor 32 will be turned off so that the output signal on the terminal 41 will remain at essentially the source voltage. However, when the voltage at the base of the input transistor 31 drops to a value near zero by reason of the discontinuance of the induced voltage in coil 17, the condition of the circuit 30 rapidly reverses with the transistor 31 ceasing to conduct whereby the output transistor 32 is turned on to conduct heavily. Thus, the voltage at the output terminal 41 will return to essentially ground level. Of course, if the voltage induced in the coil 17 is such that the right-hand terminal 42 is negative with respect to the left-hand terminal 43, the foregoing action will not occur and the voltage at the output terminal 41 will remain essentially at ground level.

In some installations, there is the possibility that the voltage induced in the pickup coil 17 can be of sufficient magnitude to damage the transistors 31 and 39. Accordingly, to limit the magnitude of the induced voltage, reversely connected diodes 50 and 51 may be connected in parallel with the coil 17 to limit the voltage that may appear across the terminals 42 and 43 to the forward breakover potential of the diodes 50 and 51. Alternatively, the diodes 53 and 54 may be connected across the terminals 42 and 43, respectively, to ground. When either of the terminals becomes sufficiently negative with respect to ground, conduction of the diodes clamps the voltage level and prevents the establishment of damaging potentials on the transistors 31 and 39.

The use of diodes such as mentioned in the preceding paragraph permits the use of the circuit without concern of damage due to excessive potentials being induced in the pickup coil 17 thereby enabling the circuit to be a relatively standard one for use in a wide variety of installations.

In order to expand the range of use of the circuit, it must further be capable of producing a stable output signal in those situations where extremely low level voltages are induced in the pickup coil 17. For example, if the induced voltage level is just barely enough to turn on the transistor 31 and there is any degree of noise present and a lack of uniformity in the induced voltage wave form, the bistable switch comprised of the transistors 31 and 32 may randomly reverse conditions. In order to preclude such an occurrence, a feedback line 56 is connected to the collector of the transistor 32 and returned through a resistor 57 and a resistor 58 to the base of the transistor 31. The circuit is completed by a resistor 59 connected to the common junction of the resistors 57 and 58 and to ground.

In operation, when the voltage induced in the coil 17 is just sufficient to turn on the transistor 31 thereby causing the transistor 32 to cease conducting, a positive feedback potential is immediately applied along the line 56 to the base of the transistor 31 to supplement the voltage induced in the coil 17 in biasing the base of the transistor 31 positive with respect to the emitter. As a result, fluctuations in the voltage induced in the coil 17 cannot result in the inadvertent turning off of the input transistor 31. Further, when the resistors 57 and 58 are appropriately selected, transistor 31 remains conducting until little or no voltage is induced in the coil 17.

In one embodiment of the invention, the resistors 35 and 38 may have a value of 2.7 K while the resistors 36 and 59 may have a value of 1.0 K. The resistor 57 may have a value of 10 K while the resistor 58 may have a value of 68 K. Each of the transistors 31, 39 and 32 may be of type 2M3392.

Figure 3:
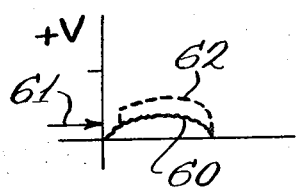
FIG. 3 is a wave form illustrating the effect of feedback employed in a circuit made according to the invention.

A typical wave form illustrating the foregoing is shown in FIG. 3. A wave 60 represents positive voltage appearing at the terminal 42 of the pickup 17, which voltage has been induced in the manner mentioned previously. A coordinate 61 illustrates the magnitude of the voltage 60 required to cause the transistor 31 to begin to conduct. Promptly when such a voltage has been attained, a feedback voltage will be provided and as a result, the voltage appearing on the base of the transistor 31 will appear to have the wave form 62. As a result, the total voltage applied to the base of the transistor 31 will be sufficiently in excess of the turn-on voltage to insure stability of operation of the switch. However, when the voltage 60 returns to zero potential, the feedback voltage will not be sufficient to maintain the transistor 31 conducting whereupon the circuit will reverse its condition.

Novel features of the circuit disclosed but not claimed herein are claimed in copending Gee application Ser. No. 222,735, filed Feb. 2, 1972, a continuation of Gee 875,983, filed Nov. 12, 1969, now abandoned. Both Gee applications are assigned of record to the assignee of this application.

I claim:

1. In a magnetic pickup sensing system having a coil subject to a change in magnetic flux linkage due to relative movement between the coil and a body of magnetic material, a circuit for converting a voltage generated in said coil by said change in flux linkage to a digital signal, comprising: a bistable electronic switch having an input connected with said coil; means for deriving said digital signal as an output from said switch as a function of the voltage generated in the coil; and means defining a feedback path from said output to said input whereby operation of said electronic switch is stabilized for low voltage levels generated in said coil, said switch comprising a first transistor having its base connected to said coil and its emitter-collector circuit connected in series with a first resistance across a source of power, a second transistor having its base connected to the common junction of said first transistor and its associated resistance and its emitter-collector circuit connected in series with a second resistance across said source of power; said feedback means comprising resistance means connected to the common junction of said second transistor and its associated resistance and to the base of said first transistor, said resistance means comprising third and fourth resistances connected in series and further including a fifth resistance connected between the common junction of said third and fourth resistances and one side of said source of power.

* * * * *